(12) United States Patent
Bjoerkman et al.

(10) Patent No.: US 6,591,687 B1
(45) Date of Patent: Jul. 15, 2003

(54) CAPACITIVE VACUUM MEASURING CELL

(75) Inventors: Per Bjoerkman, Aaland (FI); Ray Olsson, Aaland (FI)

(73) Assignee: Inficon GmbH (CH)

( * ) Notice: Subject to any disclaimer, the term of this patent is extended or adjusted under 35 U.S.C. 154(b) by 0 days.

(21) Appl. No.: 09/219,090

(22) Filed: Dec. 22, 1998

(30) Foreign Application Priority Data

Dec. 23, 1997 (CH) ............................................... 2950/97

(51) Int. Cl.$^7$ ................................................. G01L 9/12
(52) U.S. Cl. ............................... 73/724; 73/715; 73/718
(58) Field of Search .......................... 73/724, 718, 715; 361/283.4

(56) References Cited

U.S. PATENT DOCUMENTS

| | | | | |
|---|---|---|---|---|
| 3,619,742 A | * | 11/1971 | Stanley et al. | 317/246 |
| 4,329,732 A | * | 5/1982 | Kavli et al. | 361/283 |
| 4,380,041 A | | 4/1983 | Ho | 361/283 |
| 5,005,421 A | | 4/1991 | Hegner et al. | 73/72 |
| 5,257,542 A | | 11/1993 | Voss | 73/724 |
| 5,275,054 A | * | 1/1994 | Park | 73/724 |
| 5,315,877 A | * | 5/1994 | Park et al. | 73/724 |
| 5,436,795 A | | 7/1995 | Bishop et al. | 361/283.4 |
| 5,553,502 A | | 9/1996 | Hsieh | 73/724 |
| 5,733,670 A | * | 3/1998 | Takeuchi et al. | 425/699 |
| 5,776,276 A | | 7/1998 | Goebel et al. | 156/89 |
| 5,798,168 A | * | 8/1998 | Takeuchi et al. | 428/174 |
| 5,997,671 A | * | 12/1999 | Takeuchi et al. | 156/89.11 |

FOREIGN PATENT DOCUMENTS

| | | | |
|---|---|---|---|
| DE | 2 071 853 A | 9/1981 | ............. G01L/7/08 |
| DE | 2 124 770 A | 2/1984 | |
| EP | 0 009 313 A1 | 8/1979 | ............. G01L/9/12 |
| EP | 0 649 008 A2 | 10/1994 | ............. G01L/7/08 |
| EP | 0 701 112 A2 | 3/1996 | ............. G01L/7/08 |
| JP | 53 049461 | 4/1978 | ........... H01L/29/84 |
| JP | 54 141587 | 2/1979 | ........... H01L/29/84 |
| WO | WO 95/28624 | 10/1995 | |

\* cited by examiner

Primary Examiner—Harshad Patel
(74) Attorney, Agent, or Firm—Cahill, von Hellens & Glazer P.L.C.

(57) ABSTRACT

A capacitive vacuum measuring cell includes first and second ceramic housing bodies (1, 4) joined by an edge seal (3). A thin ceramic membrane (2) is supported between first and second housing bodies (1, 4) by the edge seal (3) at a small distance from the first housing body (1) creating a reference vacuum chamber (25) therebetween. An electrically conductive material (7) coats opposing surfaces of the first housing body (1) and the membrane (2) to form a capacitor. A measurement vacuum chamber (26) is provided between the membrane (2) and the second housing body (4). A port (5) communicates with the second housing body (4) to connect the measurement vacuum chamber (26) of the measuring cell to the medium to be measured. The membrane (2) is made from an $Al_2O_3$ slurry that is sintered in a first heating step, cooled, and then reheated to smooth the membrane.

21 Claims, 2 Drawing Sheets

CAPACITIVE VACUUM MEASURING CELL

BACKGROUND OF THE INVENTION

The present invention generally relates to a capacitive vacuum measuring cell.

It is known that pressures or pressure differences can be measured by applying pressure to a thin membrane and measuring its deflection. A known and suitable method for measuring the deflection is to design the membrane arrangement as a variable electrical capacitance where the capacitance change which correlates with the pressure change is evaluated by measurement electronics in the known manner. The capacitance is created by arranging a thin, flexible membrane very close to another surface and by depositing an electrically conductive film on both mutually opposed surfaces or by fabricating them from electrically conductive material. When pressure is applied to the membrane, the deflection changes the distance between the two electrodes which leads to an analyzable capacitance change of the arrangement. Sensors of this type are mass-produced from silicon. The flat basic body, as well as the membrane, often consist entirely of silicon. There are also versions that are made of composite materials such as silicon with a glass substrate. Such sensors can be produced very economically. However, in vacuum applications, pressure sensors of this type are normally usable only for higher pressures in the range of approx. $10^{-1}$ mbar to several bar. High resolution at pressures below $10^{-1}$ mbar is no longer achievable with silicon. One of the reasons for this is that the silicon surface reacts with the environment, which impairs the sensitive sensor characteristic. Already water vapor that forms part of normal atmospheric air leads to a corresponding reaction on the surfaces. The problem becomes even more serious when the sensor is used in chemically aggressive atmospheres. For this reason, attempts were made to protect such silicon sensors against external influences by passivating the surfaces. Attempts were also made to deposit protective coatings on the surfaces in order to improve the durability and the resistance against chemically aggressive environments as described in DE 41 36 987. Such measures are costly and, in the case of mechanically deformable parts such as membranes, have only limited success, in particular in highly aggressive media such as fluorine, bromic acid and their compounds which are typically used in vacuum etching processes.

For this reason, attempts were made to build vacuum measuring cells entirely from corrosion resistant materials such as $Al_2O_3$. A known arrangement of this type is shown in FIG. 1. The vacuum measuring cell consists of a ceramic plate (20) above which a membrane (22) is arranged with a small gap between the two of them and a fusible seal (21) between the ceramic plate (20) and the edge of the membrane. The ceramic plate (20) together with the membrane (22) forms a reference vacuum chamber (25) that is evacuated down during the manufacturing process through a pumping port and which is sealed with a seal (28). The mutually opposed surfaces of the ceramic plate (20) and the membrane (22) inside the reference vacuum chamber (25) are coated with electrically conductive material and connected to insulated external terminals on which the capacitance signal can be evaluated by means of an electronic device (not shown in the illustration). To achieve corrosion resistance, plate (20) and membrane (22) are both made of ceramic material such as $Al_2O_3$. This vacuum measuring cell in turn is arranged in a vacuum-tight housing (23) that features a port (24) which is connected to the media to be measured. Via port (24) of the vacuum measuring cell, the resulting measurement vacuum chamber (26) is sealed off against the membrane (22) by means of an elastomer seal (27) so that the pressures to be measured reach only the surface of the membrane (22). For the purpose of sealing, the entire cell is pressed via the ceramic plate (20) and membrane (22) against the elastomer seal (27). Up to now, vacuum measuring cells of this type have been usable only for higher pressures in the range of 0.1 mbar to 100 bar. In addition, this design leads to stress in the materials which, at lower pressures, for example <1 mbar, significantly impairs the reproducibility of measurement results and the resolution. The ceramic membranes (22) used so far have a thickness ranging from 279 $\mu$m to 2540 $\mu$m. Such designs are not suitable for achieving wide measurement ranges, in particular low pressures of 0.1 mbar to $10^{-6}$ mbar. In addition, designs of this type, as disclosed also in U.S. Pat. No. 5,553,502, are costly.

The objective of the present invention is to eliminate the disadvantage of the current state of the art. In particular the objective of the present invention is to implement an easy-to-produce, economical vacuum measuring cell that is suitable for measuring pressures from $10^{-6}$ mbar to 1000 mbar, in particular from $10^{-6}$ mbar to 1 mbar, with an accuracy of better than 1%, preferably better than 0.3% of the measured value. The measurement range can be covered or subdivided into several vacuum measuring cells or membrane versions according to the invention. In addition this vacuum measuring cell shall be corrosion resistant to aggressive media, have a compact design, and be economical to manufacture.

SUMMARY OF THE INVENTION

The capacitive vacuum measuring cell according to the invention is made entirely out of ceramic, in particular $Al_2O_3$. This results in high corrosion resistance and long term reproducibility. Only in the areas where sealing is required or where feedthroughs are provided are small amounts of materials other than $Al_2O_3$ used, if the $Al_2O_3$ is not fused without addition of the foreign material. A vacuum measuring cell consists of a first plate-shaped housing body above which a membrane, sealed along its edges, is arranged so that it encloses a reference vacuum chamber. On the side pointing away from the reference vacuum chamber, there is a second housing body, also sealed along its edges, so that a measurement vacuum chamber is formed there. This measurement vacuum chamber features a port for connecting the medium to be measured. The surface of the first housing body and the membrane that form the reference vacuum chamber are coated with an electrically conductive film, for example, gold, and constitute the electrodes of the capacitance measuring cell. The electrodes are led out, for example, through the first housing body or through the sealing area in the edge zones. The essentially parallel electrode surfaces are spaced apart from 2 $\mu$m to 50 $\mu$m. Sealing of the membrane in the edge zone against the two housings is preferably achieved through welding, for example, laser welding. Highly suitable, and simple to use, is also a glass soldering and/or brazing material that is corrosion resistant. Another possibility of achieving a sealing bond is to connect the housing parts diffusively, for example, in the green body state in which the objective is to completely avoid material other than $Al_2O_3$.

The measuring cell arrangement according to the invention essentially allows a symmetric design that avoids all stress in the housing. This is particularly important in order to achieve high measurement sensitivity combined with high accuracy and reproducibility. It also allows the utilization of a very thin ceramic membrane which is essential for reliably measuring vacuum pressures lower than 100 mbar, and in particular lower than 10 mbar, by means of capacitive, all-ceramic measuring cells. For this purpose, membrane thicknesses of 10 $\mu$m to 250 $\mu$m are needed, where membrane thicknesses of 10 $\mu$m to 120 $\mu$m are preferred in order to achieve a very good resolution. Typical membrane thicknesses are, for example:

| | |
|---|---|
| at 1000 Torr: | membrane thickness 760 $\mu$m ± 10 $\mu$m |
| at 100 Torr: | membrane thickness 345 $\mu$m ± 10 $\mu$m |
| at 10 Torr: | membrane thickness 150 $\mu$m ± 10 $\mu$m |
| at 1 Torr: | membrane thickness 100 $\mu$m ± 10 $\mu$m |
| at 0.1 Torr: | membrane thickness 60 $\mu$m ± 10 $\mu$m |
| at 0.01 Torr: | membrane thickness 40 $\mu$m ± 10 $\mu$m |

Such thin membranes are very difficult to manufacture and, after the sinter step, require at least one additional smoothing step. It is also very important for the membrane to be sufficiently helium tight which can be achieved only if the grain size of the membrane material is not too large and remains within the range of <20 $\mu$m. Smaller grain sizes of <10 $\mu$m are preferred, in particular, those <5 $\mu$m. In all cases, the cross-section of the membrane viewed across the thickness should contain at least two grains; the membranes are particularly tight if more than five grains are on top of each other.

Another important criterion for achieving an accurate measuring cell is the planarity of the membrane surface. The unevenness across the entire surface should in all cases not exceed 30% of the electrode gap, preferably not more than 15%. This means that the unevenness across the entire surface should not exceed 10 $\mu$m, preferably no more than 5 $\mu$m. The unevenness is defined here as the difference between the lowest and the highest point. To achieve the desired long-time stability, the purity of the aluminum oxide used for the membrane should be at least 94%, with preferred values being above 99%.

To ensure that the quality of the membrane seal in the edge zone is not impaired, it is advantageous to lead out the electrically conductive layers via feedthroughs that are arranged on the first housing body, rather than directly through the membrane seal or fused joint.

To ensure accurate functioning of the measuring cell over a long period of time, the reference vacuum chamber must have a high-quality vacuum with long-time stability. After evacuation, a getter should be provided that is preferably arranged in a small volume on the first housing and communicates with the reference vacuum chamber. This getter ensures that the reference vacuum pressure is lower, preferably by at least one decade, than the pressure to be measured. To prevent contaminations of the internal measuring cell space, a getter type that is not evaporating should be chosen.

Measuring cells designed according to the invention can be very compact and economical to produce. The diameter of such a cell can be between 5 and 80 mm where the measuring cell preferably has a diameter of 5 to 40 mm. The thickness of such a cell is preferably in the range of 2 mm to 25 mm.

DETAILED DESCRIPTION OF THE PREFERRED EMBODIMENTS

Figure 1:
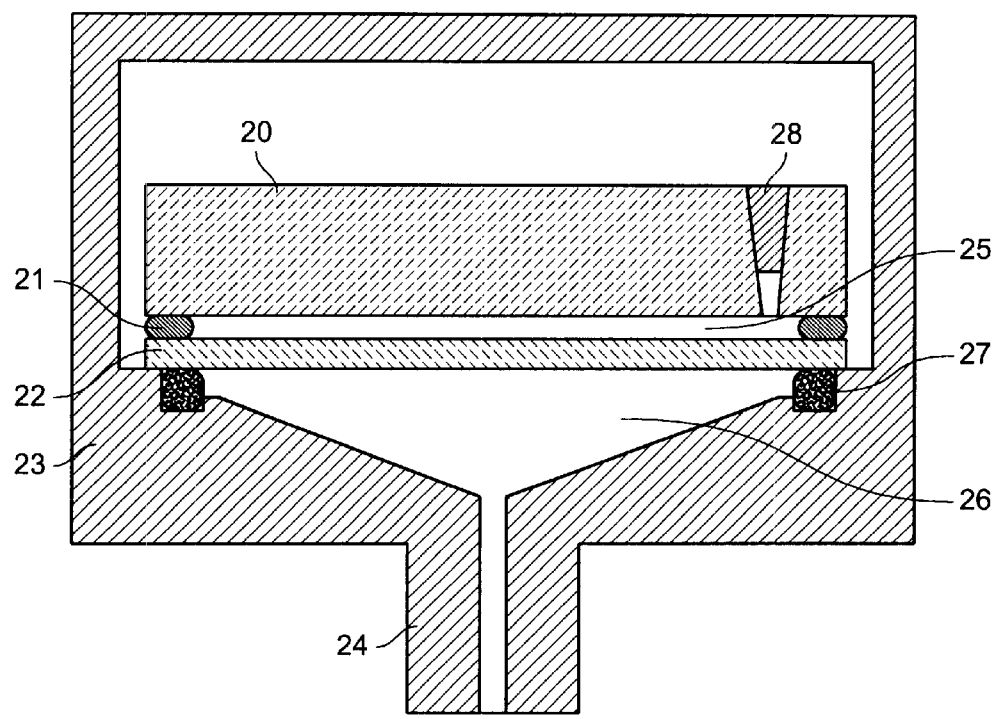
FIG. 1 is a prior art drawing of a known vacuum measuring cell built mainly from corrosion resistant materials such as $Al_2O_3$.

For manufacturing a functional measuring cell that possesses the aforementioned characteristics, the specifications of the corresponding manufacturing process must be closely followed. In particular, the manufacture of thin ceramic membranes requires special care. The membrane as well as the complete unit should be entirely free of internal stress.

Suitable $Al_2O_3$ membranes are manufactured, as is usual in the ceramic industry, by first mixing a slurry according to a specific recipe, and by thinly and evenly spreading the doughy mass on a strip shaped carrier material, for example, a plastic foil. After drying, these layers are inspected for irregularities such as bubbles or pits. This mass, which is not sintered yet, is referred to as the green body. The desired membrane shape is cut out of the strip shaped green body material, after which the material is still sticking to the plastic foil. For cutting, tools such as knives or punching tools are used, or a laser. Cutting or scoring of the green body requires particular care that no dislocations or warping against the surfaces of the future ceramic membrane occur, as this also influences the degree of surface unevenness. If a cutting knife is used, a pressing wheel can be applied on the membrane side which prevents undue warping of the green body. Subsequently the preferably circular cut membranes are separated from the foil strip by drawing off the latter, for example, across an edge. The membranes are subsequently sintered in a furnace. For sintering, the membranes are preferably placed on hard-sintered, flat $Al_2O_3$ plates that can be stacked on top of each other, and sintered typically at 1630° C. The temperature is gradually raised to 1630° C. over a period of approx. 400 minutes, which corresponds to a temperature rise of about 40° C. per minute. The temperature is then held for a few minutes at this level, for example, 6 minutes, and then slowly decreased at the rate of about 3° C. per minute over 210 minutes to 1000° C., and in a second step, with a temperature reduction of about 6° C. per minute over about 170 minutes, to room temperature. The result is a ceramic membrane which, in contrast to the green body, has a hard pure ceramic structure, and the additives of the green body material have evaporated. After this sintering step, the membrane is very uneven and, at a diameter of 40 mm, has a warpage of several millimeters.

In this condition, the membrane cannot be used due to the strong warpage and internal stress in the material. The membrane must be smoothed in at least one additional step. For this purpose, the membrane is again heated in the furnace. The membrane is carefully sandwiched between massive and highly planar, hard-sintered $Al_2O_3$ plates (also "dead", that is, large-grained $Al_2O_3$) which, for a membrane diameter of 40 mm, have a weight of several 10 to several 100 grams, or in the example about 60 grams, or are correspondingly weighted down. The temperature is slowly increased at 4° C. per minute over 390 minutes to approximately 1570° C. After a short dwell time of several minutes, approximately 25 minutes at this temperature, the temperature is lowered slowly at approx. 5° C. per minute over approx. 115 minutes until 1000° C. are reached. Subsequently, the temperature is lowered at approx. 6° C. per minute over about 166 minutes until ambient temperature is attained. After this smoothing step, the membrane has only a very small amount of residual warpage of a few tenths of a millimeter. Important in this smoothing step is that the temperature is not raised as high as in the first sintering process, preferably up to a temperature which is at most 100° C. lower than the sintering temperature. To achieve excellent results required for the measuring cell to be built, this smoothing heating step must be performed at least twice. For reasons of economy, these smoothing steps should be performed in such a way that no more than two such steps are needed. Particularly good results are achieved when the membrane is carefully separated from the plate between heating steps and redeposited in a slightly offset position. Preferably, the membrane is even placed upside down. The utilization of a stack of several flat plates with membranes sandwiched in between is particularly economical. After these steps, membranes are now available that have selectable thicknesses in the range of 10 $\mu$m to 250 $\mu$m, preferably <120 $\mu$m. With the process described above, membrane planarities can be achieved that are better than 10 $\mu$m across the entire surface, preferably even better than 5 $\mu$m. The mean grain size in the membrane material is less than 20 $\mu$m, preferably less than 10 $\mu$m, and even less than 5 $\mu$m is achievable. In this way, the requirement that at least 2 grains, preferably at least five grains, exist across the thickness, can easily be achieved. In this way, helium tight membranes, as required for vacuum measuring cell applications, can be produced. The membrane is now ready to be used for building the measuring cell.

The membrane, as well as a flat surface of the first housing body made of $Al_2O_3$ are now coated with an electrically conductive film for creating the electrodes. For example, a metallic paint, for example a paint containing gold, can be used which, for example, is brushed or sprayed, preferably printed on. Another method is to create the electrically conductive layer by means of evaporation coating, preferably by sputter coating. To allow the deposition of an accurate and defined film, it is advantageous if, for example, a gold layer that initially is deposited with a relatively large thickness of about 1 $\mu$m, is subsequently thinned down in the inner area to approx. 5 nm by means of an etching process, preferably an ion etching or sputter etching process. In this way, a thicker edge area is created which can compensate diffusion losses if, for example, a soldering and/or brazing step is performed. A preferred process that is simple to handle in practice is to first deposit a thin layer of several nm across the entire surface and subsequently a thicker layer of gold at the edge by means of screen printing (that is, a combination process and different film thicknesses). Membranes or housings processed in such a way are subsequently tempered at temperatures of several 100° C., preferably in the range of 650° C.

The second ceramic housing which is arranged on the measurement side consists of a flat ceramic plate which, on the membrane side, can have a flat recess in order to form a sufficiently large vacuum chamber. The connection port is connected to this ceramic housing by means of soldering and/or brazing, bonding or gluing, preferably by means of glass soldering and/or brazing, in such a way that the connection opening can communicate with the future measurement vacuum chamber.

In the peripheral area where the seal is created, the membrane is coated on both sides with a glass paste, preferably by means of screen printing. After drying, the membrane with the glass paste is baked in an oven at several 100° C., preferably at about 670° C. Subsequently, the glass surface is polished on both sides and, thereby preferably also, the future electrode spacing is defined.

With the aid of said coating process, the upper ceramic housing on the electrode side can, on the external surface, additionally be coated with an electrically conductive film in order to achieve shielding. Also here, the connection points are formed on the housing. In an additional step, the drill holes for the electrical feedthrough of the electrode connections are metallized, preferably with silver.

In a test phase, the first housing with the electrode and the feedthroughs, together with the deposited membrane, is checked for tightness and for correct electrode distance. Subsequently, the lower housing part is mounted, and the entire assembly is loaded with weight in order to test the function and distances. In a mounting frame, the getter connection may additionally be mounted, and under a load weight of about 200 grams, the glass seals are baked at several 100° C., preferably about 630° C. Subsequently, a test is performed to check that the required distances are maintained. If necessary, the membrane spacing can be corrected through additional weight loading or relieving, and an additional firing process. The sealing process must be executed very carefully and, as mentioned, no stress should occur in the measuring cell arrangement. Alternatively also, direct bonding can be used in place of glass or other sealants, preferably laser bonding.

The various features of novelty which characterize the invention are pointed out with particularity in the claims annexed to and forming a part of this disclosure, and are entirely based on the Swiss priority application No. 1997 2950/97 filed Dec. 23, 1997.

Figure 2:
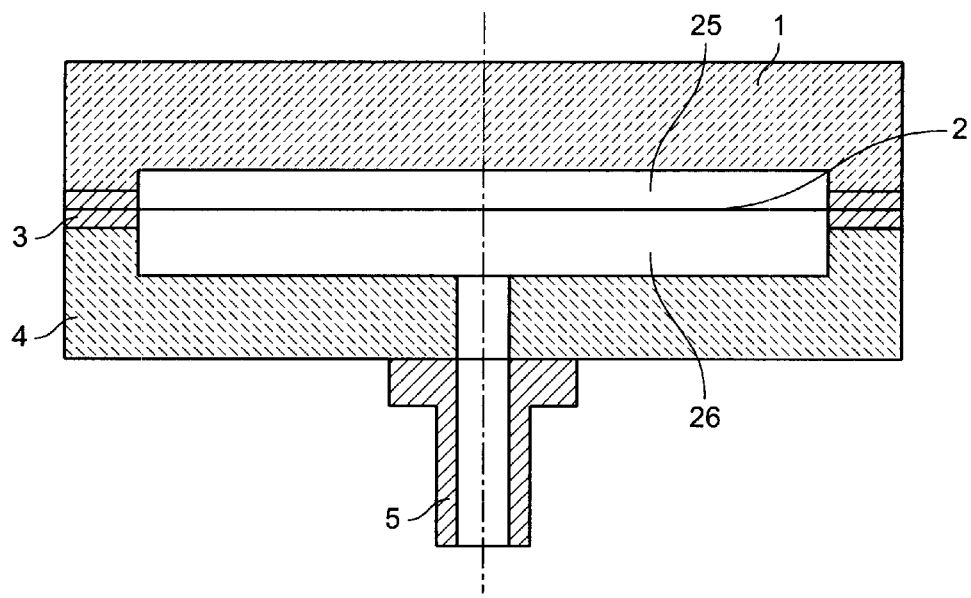
FIG. 2 shows a schematic cross-section of a capacitive vacuum measuring cell according to the invention.

The invention is described schematically based on the following illustrations which serve as examples:

FIG. 2 shows a schematic cross-section of a capacitive vacuum measuring cell according to the invention.

Figure 3:
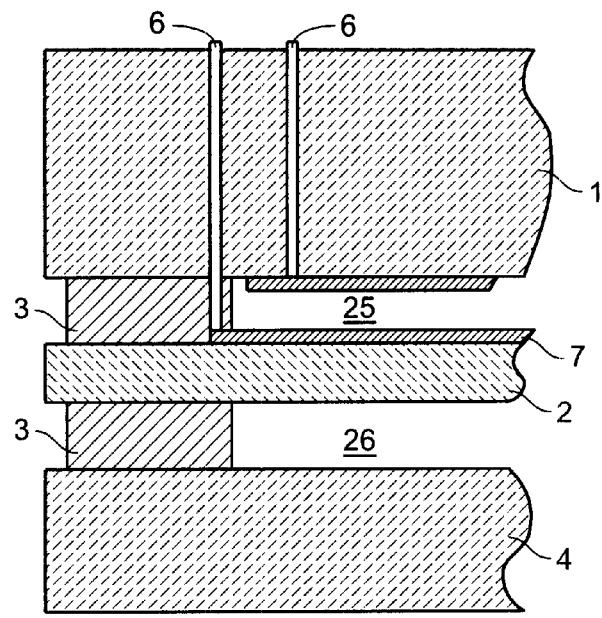
FIG. 3 shows an enlarged cross-sectional detail according to FIG. 2.

FIG. 3 shows an enlarged cross-sectional detail according to FIG. 2.

Figure 4:
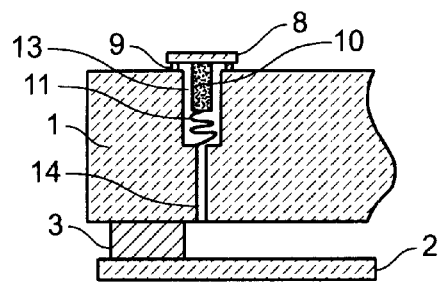
FIG. 4 shows a cross-sectional detail of a getter arrangement

FIG. 4 shows a cross-sectional detail of a getter arrangement.

Figure 5:
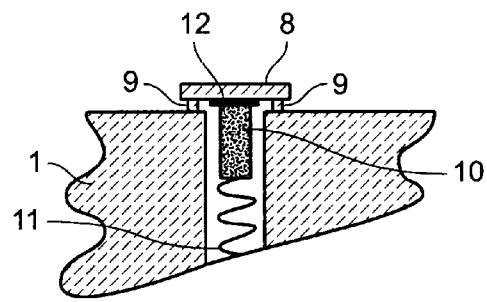
FIG. 5 shows a cross-section of another getter arrangement version.

FIG. 5 shows a cross-section of another getter arrangement version.

A capacitive measuring cell made of $Al_2O_3$ according to the invention with a structure essentially symmetrical about the membrane is illustrated by the cross-section in FIG. 2. The first housing (1) consists of a ceramic plate made of $Al_2O_3$ which along its edges is tightly bonded at a distance of 2 $\mu$m to 50 $\mu$m relative to the ceramic membrane (2) and which encloses a reference vacuum chamber (25). The distance between the two surfaces is usually established directly during the assembly by means of the sealing material (3) located between the membrane edge and the housing. In this way, a completely plane housing plate (1) can be used. In the same way, a measurement vacuum chamber (26) is formed in a second housing (4) on the opposite membrane side; this vacuum chamber is accessible for the media to be measured via a connecting port (5) through an opening in the housing (4).

FIG. 3 shows an enlarged cross-sectional detail of the edge zone of a measuring cell. The seal (3) on both sides of the membrane (2) defines, as mentioned above, the distance of the two housings (1 and 4). This seal consists, for example and preferably, of glass paste that is easy to handle and can, for example, be applied by means of screen printing. In a typical measuring cell with an external diameter of 38 mm and a free internal membrane diameter of 30 mm, the distance (3) is approx 2 to 50 μm, preferably 12 to 35 μm. In this example, the first housing (1) has a thickness of 5 mm, and the second housing (4) a thickness of 3 mm. The inner area of the second housing (4) is preferably designed with an approx. 0.5 mm deep recess, as shown in FIG. 2, in order to enlarge the measurement vacuum chamber (26). On the reference vacuum side, the membrane (2) and the housing (1) are each coated with an electrically conductive film (7). These two films are not electrically interconnected. Films (7) can, for example, be painted on, printed on, sprayed on, or be deposited by means of a vacuum process. Preferably, they are deposited by a vacuum process such as by evaporation coating or sputtering. Particularly suited as a film material is gold, which is deposited, for example, with a film thickness of 1 μm and is subsequently thinned down to a few nanometers, preferably to 5 nm, by means of sputter etching. In this way, the film thickness can be defined so that it is thin enough and is free of stress. The electrical connections of the membranes (7) are preferably established with vacuum-tight, electrically conducting feedthroughs (6), preferably through the housing (1) where they can subsequently be connected to the evaluation electronics. The evacuation line which leads through the first housing plate (1) and the getter arrangement are not shown in FIG. 3.

In order to maintain a stable reference vacuum for a long period of time in reference vacuum chamber 25, a getter 10 is provided, as shown in FIG. 4. This getter is preferably a non-evaporating type getter in order to keep any particles out of the reference vacuum chamber 25. The housing 1 includes a getter chamber 13 formed therein for containing getter 10; getter chamber 13 connects via connection line 14 to reference vacuum chamber 25. A vacuum pump is connected to the reference vacuum chamber 25. The connection 14 and the volume 13 for accommodating getter 10 are closed by cover 8; cover 8 is preferably made of metal or ceramic material. Reference vacuum chamber is evacuated so that getter 10 is activated and de-gassed. After evacuation, cover 8 is sealed to housing 1 with sealing material 9. The sealing material can, for example, be glass brazing material. Spring 11 presses getter 10 against cover 8 and ensures that getter 10 is in good thermal contact with the cover 8.

Another version of a getter arrangement is illustrated in FIG. 5 where a contacting agent (12), preferably a soldering and/or brazing material, is placed between getter (10) and cover (8) in order to achieve better thermal contact. Excellent thermal conductivity is required here so that the getter (10) can be thermally activated via the cover (8) from the outside. In addition this getter arrangement allows activation of the getter and subsequent soldering and/or brazing of the cover (8) in a single work step, provided the activation temperature of getter (10) and the soldering and/or brazing temperature of the soldering and/or brazing material (9) are essentially the same.

We claim:
1. A capacitive vacuum measuring cell including:
   a. a first housing body (1) made of $Al_2O_3$ ceramic material;
   b. a membrane (2) made of $Al_2O_3$ ceramic material and arranged proximate to said first housing body, said membrane being substantially planar and having a peripheral edge, the peripheral edge of said membrane being joined by a first edge seal to said first housing body in such a way that a reference vacuum chamber (25) is created between said first housing body and said membrane, said membrane having first and second opposing surfaces, the first surface of said membrane facing said first housing body, and said first housing body having a surface facing said membrane, said membrane having a diameter in a range of 5 to 80 mm, and said membrane having a thickness in a range of 10 μm to 250 μm, said membrane being composed of a material having a mean grain size that is $\leq 20$ μm, and said membrane having a cross-section including at least 2 grains thereacross;
   c. a second housing body (4) made of $Al_2O_3$ ceramic material and located opposite said membrane (2), said second housing body (4) being joined to the peripheral edge of said membrane by a second edge seal, said second housing body together with said membrane forming a measurement vacuum chamber (26), said second housing body including a port (5) for connecting the vacuum measuring cell to a medium to be measured;
   d. said first housing body, said second housing body, and said membrane being symmetrically and tightly connected along the peripheral edge of said membrane; and
   e. an electrically-conductive material (7) coated upon the first surface of said membrane (2) and coated upon the surface of said first housing body (1) to constitute the measuring capacitance, the electrically-conductive material coated upon the first surface of said membrane being arranged at a distance of 2 μm to 50 μm from the electrically conductive material coated upon the first housing body.

2. A measuring cell according to claim 1 wherein the electrically conductive material coated upon the membrane and the electrically conductive material coated upon the housing body, and which constitute the measurement capacitance are arranged at a distance of 12 to 35 μm from each other.

3. A measuring cell according to claim 1 wherein said first housing body (1) and said second housing body (4) are symmetrically and tightly connected with the peripheral edge of said membrane (2) by fusion, by diffusion bonding, by soldering and/or by brazing.

4. A measuring cell according to claim 1 wherein the membrane has a thickness in the range of 10 μm to 120 μm.

5. A measuring cell according to claim 4 where the mean grain size of the membrane material is $\leq 10$ μm.

6. A measuring cell according to claim 4 the membrane includes at least 5 grains across the thickness of the cross-section thereof.

7. A measuring cell according to claim 1 wherein the unevenness of membrane (2) across its entire surface is not greater than 30% of the electrode spacing, preferably not greater than 15%.

8. A measuring cell according to claim 1 wherein the unevenness of membrane (2) across its entire surface is not greater than 10 μm, preferably not greater than 5 μm.

9. A measuring cell according to claim 1 wherein the purity of the $Al_2O_3$ of membrane (2) is at least 94%, preferably at least 99%.

10. A measuring cell according to claim 1 where the contacts to the electrically conductive layers (7) are led out through sealed feedthroughs (6) on the first housing body (1).

11. A measuring cell according to claim 1 where on or in the first housing (1) a volume (13) for accommodating getter (10) is provided which features a connection (14) to the reference vacuum chamber (25) and where the volume (13) is sealingly tightly closed with a cover (8).

12. A measuring cell according to claim 11 where the getter is of the "non-evaporating" type.

13. A measuring cell according to claim 11 where getter (10) within volume (13) is pressed by means of spring (11) against cover (8).

14. A measuring cell according to claim 11 where a contacting material (12), preferably a soldering and/or brazing material, is provided between getter (13) and cover (8).

15. A measuring cell according to claim 1 where the pressure in the reference vacuum chamber (25) is lower than the lowest pressure to be measured, preferably lower by at least one decade.

16. A measuring cell according to claim 1 wherein the membrane diameter is in the range of 5 to 40 mm.

17. A measuring cell according to claim 1 where at least one of the surfaces of housings (1, 4) is coated with an electrically conductive film for the purpose of shielding.

18. The measuring cell according to claim 1 wherein said measuring cell is capable of measuring pressures smaller than 1000 mbar with a resolution of better than 1%.

19. The measuring cell according to claim 18 wherein said measuring cell is capable of measuring pressures smaller than 1 mbar.

20. The measuring cell according to claim 19 wherein said measuring cell is capable of measuring such pressures with a resolution of better than 0.3%.

21. The measuring cell according to claim 18 wherein said measuring cell is capable of measuring such pressures with a resolution of better than 0.3%.

* * * * *